United States Patent [19]

Dispenza

[11] Patent Number: 4,836,018

[45] Date of Patent: Jun. 6, 1989

[54] RAIN GAUGE WITH IMPROVED SYPHON DISCHARGE

[76] Inventor: Charles Dispenza, 78-B Newark Way, Maplewood, N.J. 07040

[21] Appl. No.: 258,806

[22] Filed: Oct. 17, 1988

[51] Int. Cl.⁴ .............................................. G01W 1/14
[52] U.S. Cl. ...................................... 73/171; 73/313; 73/321; 340/624; 222/416
[58] Field of Search ................. 73/171, 226, 313, 306, 73/319, 321; 340/601, 602, 624; 222/416, 464, 437, 457; 200/61.2, 61.21

[56] References Cited

U.S. PATENT DOCUMENTS

| | | | |
|---|---|---|---|
| 2,063,430 | 12/1936 | Graser | 222/464 |
| 2,606,690 | 8/1952 | Hansen | 73/226 |
| 2,630,010 | 3/1953 | Miles | 73/226 |
| 2,735,298 | 2/1956 | Dispenza | 73/171 |
| 2,859,899 | 11/1958 | Kramer et al. | 222/464 |
| 2,908,165 | 10/1959 | Dispenza | 73/171 |
| 3,393,559 | 7/1968 | Oviatt | 73/171 |
| 3,656,657 | 4/1972 | Smith et al. | 222/464 |
| 3,919,455 | 11/1975 | Sigdell et al. | 73/226 |
| 4,109,827 | 8/1978 | Leonard, Jr. | 222/464 |
| 4,159,790 | 7/1979 | Bailey | 222/464 |
| 4,459,584 | 7/1984 | Clarkson | 340/624 |
| 4,520,667 | 6/1985 | Nelson | 73/171 |

FOREIGN PATENT DOCUMENTS

| | | | |
|---|---|---|---|
| 2720602 | 11/1978 | Fed. Rep. of Germany | 73/171 |
| 52-13381 | 2/1977 | Japan | 73/171 |
| 58-50160 | 10/1984 | Japan | 73/171 |
| 591785 | 2/1978 | U.S.S.R. | 73/171 |
| 888049 | 12/1981 | U.S.S.R. | 73/290 R |
| 137561 | 1/1920 | United Kingdom | 73/171 |
| 502107 | 3/1939 | United Kingdom | 73/171 |
| 1289138 | 9/1972 | United Kingdom | 73/171 |

*Primary Examiner*—William A. Cuchlinski, Jr.
*Assistant Examiner*—Diego F. F. Gutierrez
*Attorney, Agent, or Firm*—Howard E. Thompson, Jr.

[57] ABSTRACT

An improved rain gauge in which a large rain collector feeds collected rain into a receptacle having 1/5 the cross-sectional area, and in which a float and counterweight connected by a flexible strand passing over a pulley mechanism creates electrical impulses with each 1/100 inch of rainfall added to the receptacle, and in which the receptacle is periodically emptied by a syphon device of generally U-shaped contour providing intake leg and discharge leg, wherein complete emptying of the syphon tube is facilitated by incorporating within the discharge leg thereof a small diameter tube closed at the top end, open at the bottom end, and having a plurality of small holes spaced longitudinally thereof, whereby air entering the small tube and passing through the longitudinally spaced holes therein, serves to equalize air pressure and permit the full discharge of liquid from the syphon tube.

9 Claims, 3 Drawing Sheets

RAIN GAUGE WITH IMPROVED SYPHON DISCHARGE

This invention relates to a rain gauge in which a large diameter collector feeds collected rain into a smaller diameter receptacle in which a float is mechanically linked with means for generating electrical impulses with each predetermined increment of upward movement of the float, said receptacle being provided with a syphon discharge tube which automatically empties the receptacle when collected rain reaches a predetermined level and wherein accuracy in the timing of such electrical impulses is enhanced by providing in the discharge leg of the syphon tube a small diameter inner tube with radial apertures permitting air flow to the interior of the discharge leg, thereby assuring complete emptying of the discharge leg at the end of each discharge cycle.

BACKGROUND OF THE INVENTION

Rain gauges of the general type herein disclosed have been known for more than 30 years and have been illustrated and described in my U.S. Pat. No. 2,735,298 issued Feb. 12, 1956 and 2,908,165 issued Oct. 13, 1959 (on application filed Dec. 10, 1957). These patents both disclose the use of a syphon tube for periodically emptying the rain metering receptacle. In U.S. Pat. No. 2,735,298 upward movement of a float in the rain collecting receptacle is translated to a stylus which graphically records the level of collected rain on the recording sheet of a time controlled rotating drum; whereas U.S. Pat. No. 2,908,165 translates upward movement of the float to electrical impulses through an effective but somewhat intricate and cumbersome mechanism.

While the devices of these prior patents perform effectively in the macro sense they proved to be somewhat unreliable in the micro sense in that incremental upward movements of the float in the rain metering receptacle did not always provide a true indication of the quantity of rain being collected. This interfered with the accurate recording of the rate of rainfall within time intervals of special interest.

This problem in the micro responsiveness of the earlier instruments is brought about by irregularities in the functioning of the syphon tube in the periodic automatic emptying of the rain metering receptacle. It sometimes happens that at the end of a discharge cycle a slug of water will remain in the lower end of the discharge leg of the syphon tube. When this happens an entrapped volume of air in the syphon tube can interfere with flow of water into the intake end of the syphon tube with the result that for a time the rate of rise of water in the collecting receptacle may be a bit more rapid than an accurate measure of collected rainfall; and as pressure is built up in the air pocket within the syphon tube, a point will be reached when this pressure forces some or all of the water slug in the discharge leg to be ejected. When this happens the sudden rise of liquid in the intake leg of the syphon tube causes a momentary drop or a slowing of the rate of rise, of the liquid level in the metering receptacle. Depending upon the size of the water slug which had remained in the discharge leg at the end of a previous discharge cycle it could require one, two, or even three such build-up of pressure on the entrapped air pocket in the syphon tube to fully clear the water slug from the discharge leg; and with each such pressure build-up the rate of rise of collected rain in the metering receptacle is first increased and then momentarily decreased with respect to the true rate of rain addition to the metering receptacle.

It will be apparent that these unpredictable variations in rate of rise of collected rain in the receptacle present significant problems for those interested in accurate micro recording of the rate at which rain is falling. For this reason the device disclosed in my above mentioned patents have not attained broad acceptance in the market place.

THE INVENTION

It has now been discovered that the problems above mentioned can be overcome to provide a rain gauge having reliable micro sensitivity by incorporating in the discharge leg of the syphon tube a means for equalizing air pressure and preventing the detention of a slug of water in the discharge tube at the end of a discharge cycle.

Regarded in certain of its broader aspects the present invention comprises an improved rain rauge in which a large rain collector feeds collected rain into a receptacle having 1/5 the cross-sectional area, and in which a float and counter-weight connected by a flexible strand passing over a pulley mechanism creates electrical impulses with each 1/100 inch of rainfall added to the receptacle, and in which the receptacle is periodically emptied by a syphon device of generally U-shaped contour providing intake leg and discharge leg, wherein complete emptying of the syphon tube is facilitated by incorporating within the discharge leg thereof a small diameter tube closed at the top end, open at the bottom end, and having a plurality of small holes spaced longitudinally thereof, whereby air entering the small tube and passing through the longitudinally spaced holes therein, serves to equalize air pressure and permit the full discharge of liquid from the syphon tube.

The improved rain gauge of the present invention employs a conventional rain collector of a general funnel-like configuration having a rain collecting area of 50 square inches which feeds collected rain into a metering receptacle having a cross-sectional area of 10 square inches. This 5 to 1 area ratio means that a rise in the liquid level in the metering receptacle of 0.05" equates to rainfall of 0.01".

Supported above the metering receptacle is a coaxial pulley and ratchet gear mechanism. The pulley component of this mechanism engages and is rotated by a flexible strand having one end secured to a float within the metering receptacle and the other end secured to a counterweight moving externally of the receptacle and just balancing the weight of the float, whereby changes in water level within the receptacle will be accurately converted to rotational movement of the pulley.

In the coaxial mounting of the pulley and ratchet gear there is interposed a clutch device which translates rotary movement of the pulley to the ratchet gear when water is rising in the metering receptacle, but produces no movement in the ratchet gear when water is descending in the metering receptacle.

The ratchet gear suitably contains 60 teeth so aligned with an associated micro switch as to activate the switch at each high point and low point of the gear teeth whereby a full rotation of the ratchet gear will produce 120 micro switch impulses.

The pulley suitably has an effective diameter of 1.97', equating to a circumference of 6.189". This means that the movement between successive micro switch impulses equates to approximately 0.05" in circumferential movement of the pulley and vertical movement of the float within the metering receptacle. Thus the pulley and ratchet gear mechanism, in association with the micro switch, produces an electrical impulse with each incremental addition of 0.01" of rainfall.

The metering receptacle is provided with a syphon tube of generally U-shaped configuration and having a short intake leg and a substantially longer discharge leg. The intake leg is fixedly mounted to the exterior of the metering receptacle at a point sufficiently above the base thereof so that sufficient water will remain in the metering receptacle at the end of a discharge cycle for the float to be freely suspended in the water so that immediately after a discharge cycle the accurate metering of rainfall can be resumed.

The end of the syphon tube is suitably located approximately 2.5" above the intake connection with the metering receptacle, permitting activation of the cycle and emptying of the metering receptacle, when the rainfall collected equates to about 0.5".

The discharge leg of the syphon tube extends at least 2" and suitably about 3 to 5" below the bottom of the metering receptacle. When the discharge cycle is activated by a sufficient rise of liquid in the metering receptacle the discharge of the approximately 2.5" of accumulated liquid is accomplished in approximately 20 seconds, with this time being slightly reduced as the length of the discharge tube is increased. During this 20-second interval the recording of rate of rain accumulation is momentarily interrupted, but except in times of exceedingly heavy rainfall, the amount of rainfall which will be unmetered during such 20-second interval becomes insignificant.

As earlier mentioned the use of syphon tubes in rain gauges for emptying the metering receptacle has led to somewhat eratic performance due to the tendency of a slug of water to remain in the discharge leg of the syphon tube at the end of a discharge cycle. When this happens the adhesion between the water and the walls of the discharge leg can be sufficient to create an air pocket within the syphon tube which will prevent free flow of rain collected in the metering receptacle into the intake leg of the syphon tube. To the extent that flow of water into the intake leg is thus restricted, the rise of water in the metering receptacle, and hence the frequency of electrical impulses, will be slightly more rapid that a true reflection of actual rate of rainfall. A point will ultimately be reached, however, in which the pressure in the air pocket in the syphon tube will be sufficiently increased to displace the slug of water retained in the discharge leg, permitting a sudden rise of water in the intake leg and a momentary irregularity in the rate of rise of water in the metering receptacle and in the frequency of electrical impulses.

To overcome the problems above mentioned the syphon tube of the improved rain gauge is provided in the discharge leg with an inner small diameter tube, approximately 3 to 4" long which is closed at the upper end, open at the bottom end, and which is provided with a plurality of longitudinally spaced radial apertures permitting atmospheric air pressure to reach any air pocket formed within the syphon tube.

This inner pressure equalizing tube can be supported within the discharge leg of the syphon tube in various ways to properly position its lower end within the tapered lower end of the discharge leg of the syphon tube. One way of mounting the inner tube is to employ a flexible strand or wire extending from the upper closed end thereof through the U-shaped contour of the syphon tube to a point of anchorage at the intake end thereof. Alternatively, the inner tube can be supported by small spring clips secured at longitudinally spaced intervals on the inner tube and providing frictional, sliding engagement with inner walls of the discharge leg of the syphon tube.

The addition of the pressure equalizing tube within the discharge leg of the syphon tube assures complete emptying of the syphon tube on each discharge cycle and eliminates the performance irregularities previously encountered due to failure of the discharge leg of the syphon tube to be completely evacuated at the end of each discharge cycle.

Novel features of the improved rain gauge will be more fully understood from a consideration of the accompanying drawing in which the various parts thereof have been identified by suitable reference characters in the several views and in which.

Figure 1:
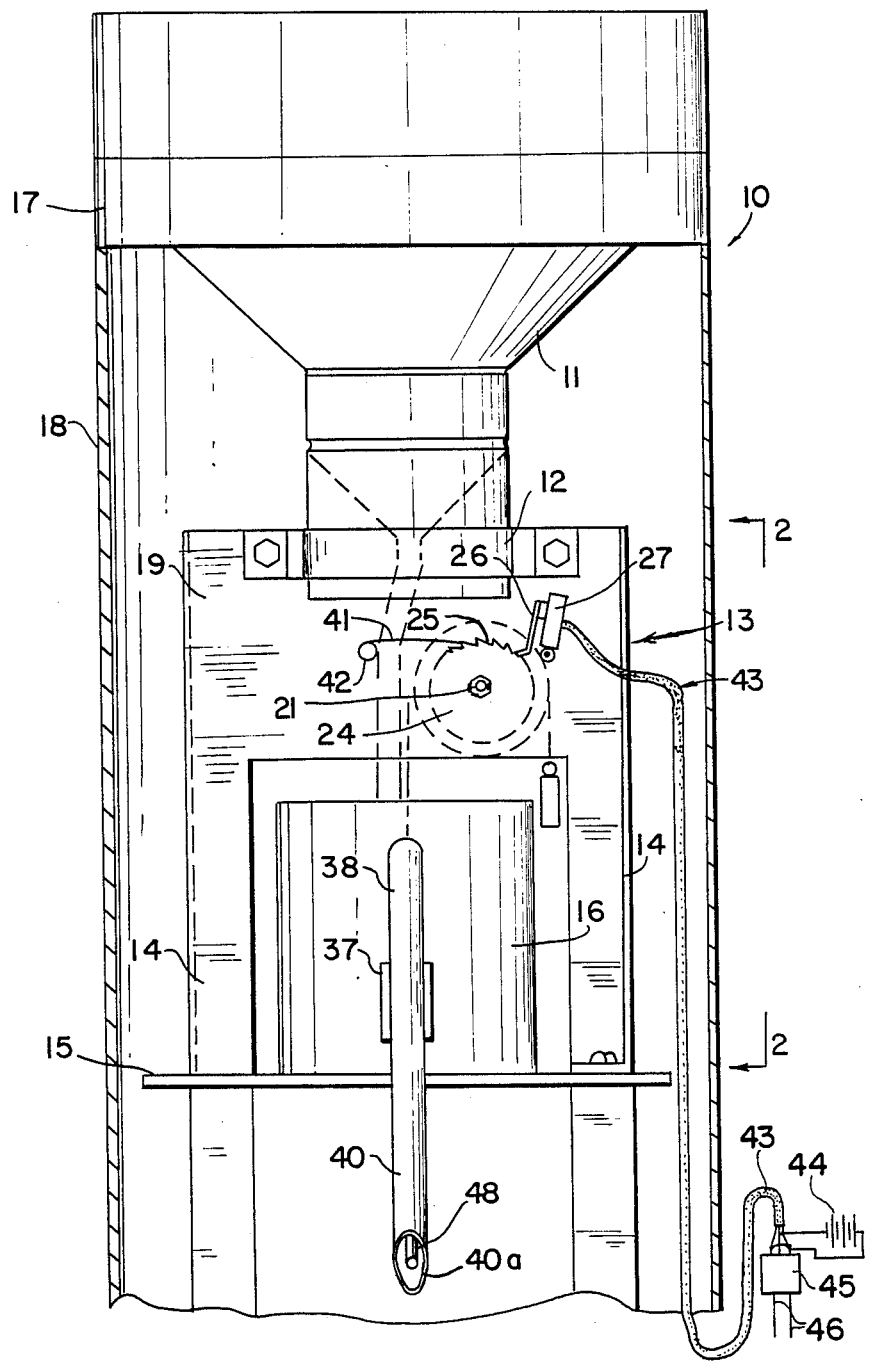
FIG. 1 is a side elevation view of the improved rain gauge with part of the casing broken away and in section, and illustrating the electrical recording mechanism.

As shown in the drawing the improved rain gauge 10 comprises a standard rain collecting funnel 11 having a rain collecting area of 50 square inches which is detachably secured by bracket 12 to metering assemblage 13 comprising upstanding frame 14, and supporting base 15 having centrally thereof a metering receptacle 16 of cylindrical contour with a cross sectional area of 10 square inches. This assemblage is enclosed within a casing suitably comprising a top casing part 17 and a side casing part 18 which has been shown in section to reveal the inner mechanism.

Figure 2:
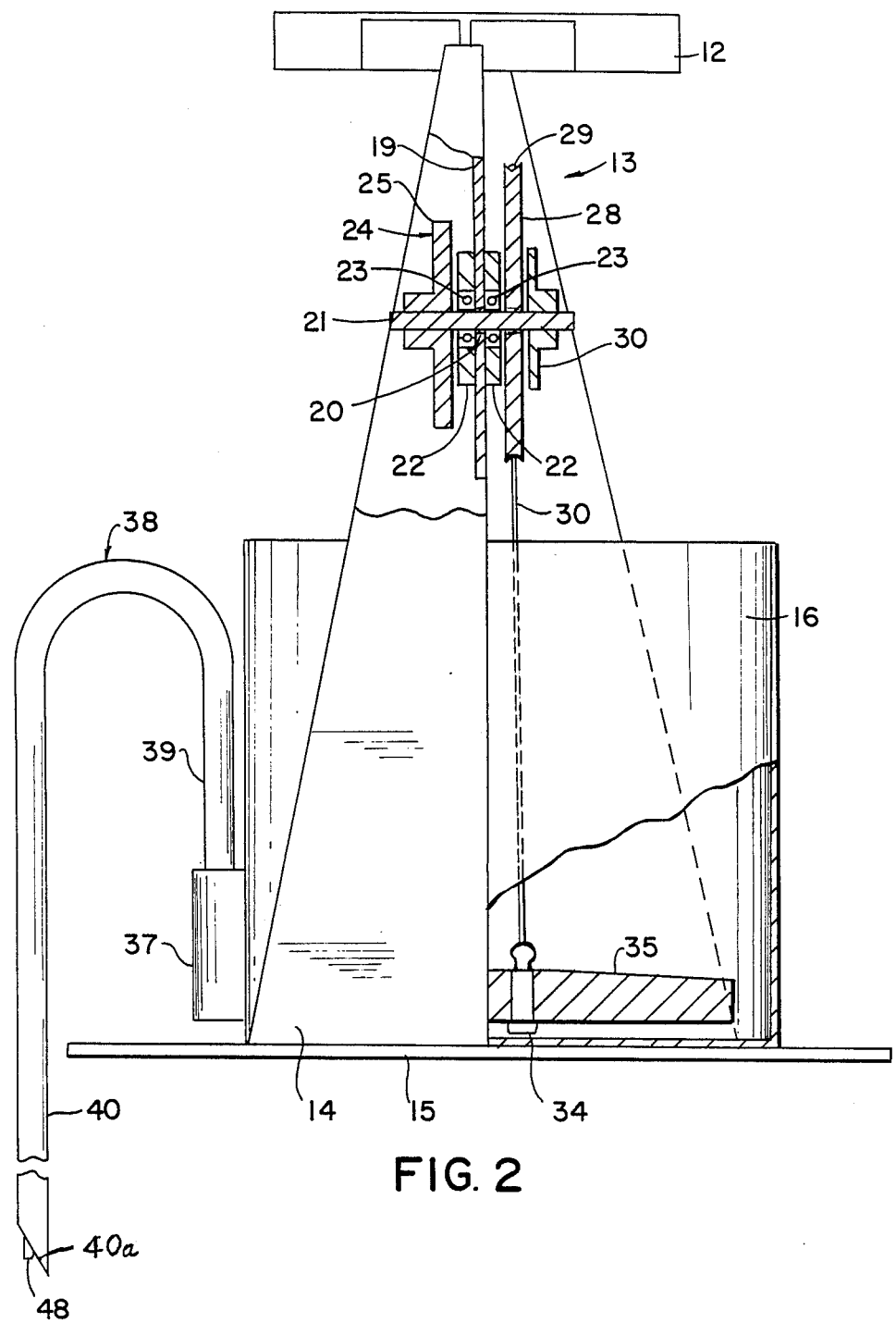
FIG. 2 is a fragmentary sectional view taken in the direction of the arrows 2—2 in FIG. 1.

The upstanding frame 14 carries a transverse and vertically oriented plate 19, measuring approximately 3½×5 inches having an offset aperture 20 to freely receive a perpendicularly disposed axle 21 as clearly shown in FIG. 2 of the drawing. For mounting of the axle 21 the plate 19 is suitably provided at opposed sides thereof with lateral extensions 22 supporting anti friction bearings 23 facilitating free rotation of the axle 21.

The axle 21 has fixedly secured thereto at the side seen in FIG. 1 a ratchet wheel 24 approximately 1½" in diameter and carrying 60 teeth 25 which register with the spring arm 26 of micro switch 27 secured to the plate 19. The micro switch is of the double pole variety to create an electrical impulse at each high point and low point of movement of the spring arm 26 over the teeth 25.

Figure 3:
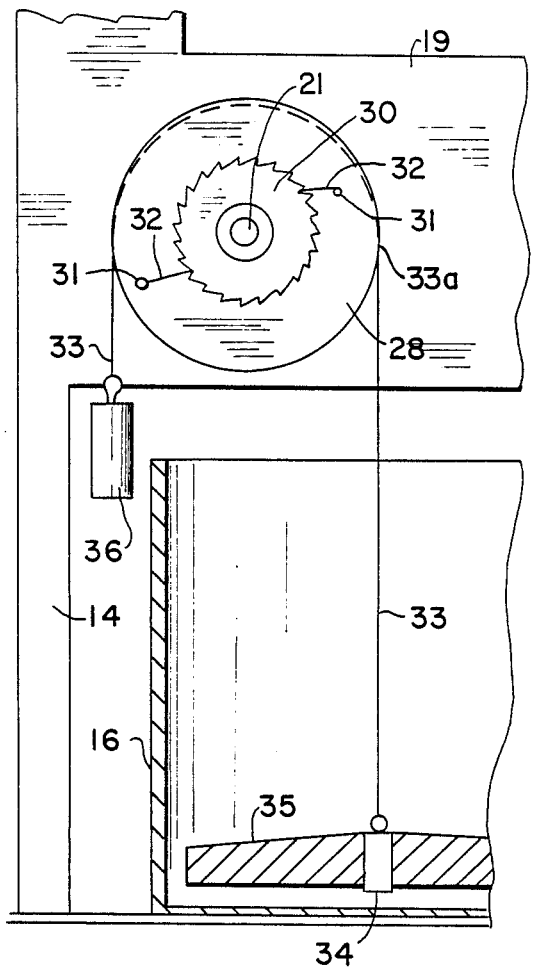
FIG. 3 is a fragmentary rear view of the device taken in the direction of the arrows 3—3 in FIG. 2.

As shown in FIGS. 2 and 3 the opposite end of the axle 21 supports a pulley 28 which is freely rotatable thereon and which suitably has an effective diameter at the base of the groove 29 thereof of about 1.97".

Externally of the pulley 28 and fixedly secured to the axle 21 is a fine tooth ratchet wheel 30 about 1" in diameter.

As shown in FIG. 3 the pulley 28 at diametrically opposed points 31 supports spring fingers 32 providing clutch engagement with a ratchet wheel 30, such that, as seen in FIG. 3 the rotation of the pulley 29 in a counter clockwise direction acts to rotate the ratchet wheel 30, whereas rotation of the pulley 28 in a clockwise direction causes no rotation of the ratchet wheel 30.

The pulley 28 carries strand 33 having one end secured at 34 centrally of a float 35 within the metering receptacle 16, and the other end secured to a counter-weight 36. It should be noted in this connection that the positioning of the axle 21 is such that the strand 33 as it engages float 35 is substantially at the axis of receptacle 16, and the counter-weight 36 is closely spaced from and externally of the receptacle 16.

At the lower portion of the receptacle 16 there is mounted by suitable coupling 37 a U-shaped syphon tube 38 having an intake leg 39 approximately 2.5" in length and a discharge leg 40 which is substantially longer, suitably extending about 3 to 5 inches below the bottom of the metering receptacle 16.

The arrangement of parts in FIG. 3 should be visualized as the end of a discharge cycle from the metering receptacle 16. As rain is subsequently collected, causing the float 35 to rise, this induces counter clockwise rotation of the pulley 28, which is translated to the axle 21 through ratchet wheel 30, thereby rotating the ratchet wheel 24 and activating the micro switch 27. It will be noted in this connection that to prevent any possible slippage between strand 33 and pulley 28, the strand is bonded to the pulley 28 substantially at the location 33a. It is thereby apparent that all collection of rain causing elevation of the float 35 should be transmitted to the ratchet wheel 24, which, as it is shown in FIG. 1 of the drawing should only rotate in the clockwise direction. To prevent any inadvertent counter clockwise movement it is desirable to employ a spring finger 41 mounted at 42 on the plate 19 in spaced relation to the ratchet wheel 24.

With the mechanism as above described each 0.01 inch of collected rainfall will create an electrical impulse through the action of micro switch 27; and the metering receptacle 16 will be automatically emptied by the water level sufficiently rising to activate the syphon 38 after each ½" of rainfall has reached the metering receptacle 16. Once activated the syphon 38 will empty the receptacle 16 within an interval of about 20 seconds during which time the metering of rainfall will be interrupted. Such a brief interruption is of no consequence, however, except in the rare instance in which a cloud burst or other very heavy rain is being metered.

The rain gauge is intended to operate reliably and without attention for long periods of time, and one potential problem could arise in the event of encountering a long dry period immediately after emptying of the metering receptacle 16. Such an extended dry spell could lead to evaporation of liquid and further lowering of the float 35 within the metering receptacle 16. This could cause a flat bottomed float to be adhered by a thin layer of liquid to the bottom of metering receptacle 16. To prevent this possibility the hub mounting 34 for the strand 33 suitably extends below the bottom of the float 35 as shown in FIG. 2.

As diagramatically shown in FIG. 1 the three wires 43, coming from the micro switch 27, and in circuit as shown with a battery or other power source 44, lead to a conventional relay 45 which, with each activation of micro switch 27 creates a pulse in output lines 46 and disconnects the established circuit to be ready for the next activation of micro switch 27. The periodic pulses in output lines 46 can be used in various ways, as desired, such as operating a simple counter to record each 0.01" of rainfall, operating the stylus of an instrument for recording rainfall as a function of time, or feeding such impulses to data collecting centers for the integrated reporting of rainfall in different areas.

Figure 4:
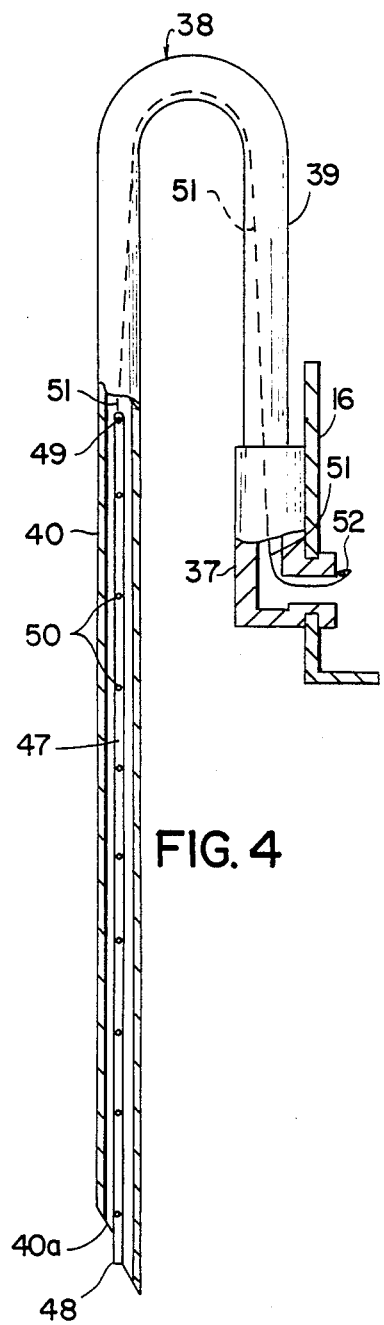
FIG. 4 is an enlarged view of improved syphon tube structure with inner air vent tube.
Figure 5:
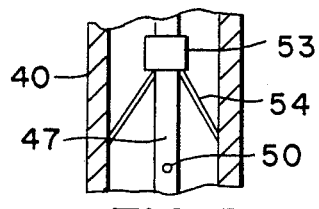
FIG. 5 is a fragmentary view of the assemblage shown in FIG. 4 illustrating a modified mounting of the air vent tube.

The accuracy of the improved rain gauge in generating impulses in the output lines 46 with each 0.01" of collected rainfall, particularly in the period following emptying of the metering receptacle 16 is significantly enhanced by the syphon tube assembly 38 as more clearly shown in FIGS. 4 and 5 of the drawing. The U-shaped syphon tube with intake leg 39 and discharge leg 40 is suitably fashioned from 5/16" O.D. copper tubing with the bottom end 40a of the discharge leg being cut at an angle as shown. Arranged within the discharge leg 30 is a thin-walled tube 47, having an outside diameter of approximately 1/16" open at the bottom end 48, closed at the top end 49, and having a plurality of apertures 50 spaced longitudinally thereof. The tube 47 can be supported within the syphon tube in various ways; a preferred approach being to employ a strand or wire 51 extending from the upper end 49 of the tube 47 to an anchoring point 52 in the syphon tube mounting 37, the length of the strand 51 being such as to position the lower end 48 of the tube 47 in substantial alignment with the angled lower end 40a of the discharge leg as shown.

Alternatively, the tube 47 can be supported axially of the discharge leg 40 by means of a plurality of spacer members 53 secured at spaced intervals to the tube 47 and having three or more spring fingers 54 supportingly engaging inner walls of discharge leg 40.

The tube 47 should extend three to four inches into the discharge leg 40 of the syphon tube to provide an air vent to permit discharge of any slug of water which may be retained in the discharge leg 40 of the syphon tube at the end of a discharge cycle. If such a slug of water remains in the discharge leg the air pressure above such slug of water can adversely affect the rate of rise of water in the intake leg 39 with resultant irregularity in the float movement and in the generation of electrical impulses as rainfall is being collected after an emptying of metering receptacle 16. Such irregularity has not been experienced with the improved construction because the apertured tube 47 permits the rapid discharge of any water slug which may be retained in the discharge leg 40.

The improved rain gauge is to provide many months of reliable unattended operation. The small amount of electrical energy needed can be provided by a standard 6-volt or 12-volt battery 44 appropriate for the particular type relay 45 being employed. It is visualized therefore that the improved rain gauge placed at numerous strategic points with respect to a data collecting center provides a useful tool for assisting the computerized monitoring of rainfall.

Various changes and modifications in the rain gauge as herein disclosed may occur to those skilled in the art, and to the extent that such changes and modifications are embraced by the appended claims, it is to be understood that they constitute part of the present invention.

I claim:

1. A rain gauge comprising a large rain collector feeding collected rain into a cylindrical receptacle having 1/5 the cross-sectional area, a float within said receptacle and counter-weight externally thereof connected by a flexible strand passing over a pulley mechanism which through micro switch and relay creates electrical impulses with each 1/100 inch of rainfall added to the receptacle, said receptacle having connected to the lower portion thereof the short intake leg of a generally U-shaped syphon tube having a longer discharge leg extending substantially below the base of said receptacle, wherein complete emptying of the syphon tube is facilitated by incorporating within the discharge leg thereof a small diameter tube, closed at the top end, open at the bottom end, and having a plurality of small holes spaced longitudinally thereof, whereby air entering the small tube and passing through the longitudinally spaced holes therein, serves to equalize air pressure and permit the full discharge of liquid from the syphon tube.

2. A rain gauge as defined in claim 1 wherein said pulley mechanism is carried by a horizontally axle rotatably supported in anti-friction bearings in a vertically disposed plate above said receptacle, the pulley being rotatably mounted on said axle at one side of the mounting plate in close relation to a smaller ratchet wheel which is fixedly secured to the axle, and a plurality of spring members circumferentially spaced on said pulley, and operatively engaging said ratchet wheel to provide one directional rotation of said pulley, a second ratchet wheel being fixedly secured to said axle at the opposed side of said mounting plate in registering engagement wtih the spring arm of a micro switch, said micro switch being a double pole switch activated at each high point and low point of movement of the spring arm with respect to said ratchet wheel, and the position of said axle and mounting plate being offset with respect to the axis of said receptacle in a manner to dispose the peripheral portion of the pulley aligned with float supporting strand at approximately the axis of said receptacle.

3. A rain gauge as defined in claim 2 in which the pulley diameter and the number of teeth in the second named ratchet wheel are so coordinated as to provide activation of the micro switch with each 0.01" of collected rain fall.

4. A rain gauge as defined in claim 3 wherein the pulley has an effective diameter of approximately 1.97" and said second named ratchet wheel has 60 teeth.

5. A rain gauge as defined in claim 2 wherein the strand and float are joined by a hub member which extends below the lower surface of the float, thereby preventing surface contact between the float and receptacle bottom.

6. A rain gauge as defined in claim 1 wherein the short intake leg of the syphon tube is of a length to dispose the U-shaped portion slightly below the top of said receptacle, and in a position to become functional when the rainfall collected in said receptacle equates to about 0.5" of rainfall.

7. A rain gauge as defined in claim 6 wherein the syphon tube is a copper tube having an outside diameter of approximately 5/16", the end of the discharge leg is cut at a sharply inclined angle, the inner air vent tube has approximately a 1/16" outer diameter, and having its lower end substantially aligned with the angled lower end of the discharge leg.

8. A rain gauge as defined in claim 7 wherein said small diameter tube extends about three to four inches along said discharge leg and is supported therein by a flexible strand extending over the U-shaped portion of the syphon tube and anchored at the base of said intake leg.

9. A rain gauge as defined in claim 7 wherein said small diameter tube extends about three to four inches along said discharge leg and is supported therein by mounting members secured at longitudinally spaced intervals on said small diameter tube and having a plurality of downwardly extending spring fingers for supportively engaging inner walls of the discharge leg and disposing the small diameter tube coaxially thereof.

* * * * *